US012649109B2

(12) United States Patent
Yip et al.

(10) Patent No.: US 12,649,109 B2
(45) Date of Patent: Jun. 9, 2026

(54) METHODS AND SYSTEMS FOR PROCESSING AUDIO SIGNALS TO IDENTIFY SENTIMENTS FOR USE IN CONTROLLING GAME ASSETS

(71) Applicants: Sony Interactive Entertainment Inc., Tokyo (JP); Sony Interactive Entertainment LLC, San Mateo, CA (US)

(72) Inventors: Rae Yip, San Mateo, CA (US); Jillian Moore, San Mateo, CA (US); Celeste Bean, San Mateo, CA (US); Ensha Neron, San Mateo, CA (US); Mehak Bhat, San Mateo, CA (US); Julie Ahn, San Mateo, CA (US)

(73) Assignees: Sony Interactive Entertainment Inc., Tokyo (JP); Sony Interactive Entertainment LLC

( * ) Notice: Subject to any disclaimer, the term of this patent is extended or adjusted under 35 U.S.C. 154(b) by 150 days.

(21) Appl. No.: 18/530,140

(22) Filed: Dec. 5, 2023

(65) Prior Publication Data

US 2025/0177864 A1    Jun. 5, 2025

(51) Int. Cl.
*A63F 13/54*      (2014.01)
*A63F 13/424*     (2014.01)

(52) U.S. Cl.
CPC ........... *A63F 13/54* (2014.09); *A63F 13/424* (2014.09); *A63F 2300/6063* (2013.01)

(58) Field of Classification Search
CPC .... A63F 13/213; A63F 13/215; A63F 13/424; A63F 13/428; A63F 13/44; A63F 13/537;
(Continued)

(56) References Cited

U.S. PATENT DOCUMENTS

2008/0215973 A1* 9/2008 Zalewski ................ A63F 13/77
                                                              715/764
2008/0215983 A1   9/2008 Wierowski et al.
(Continued)

FOREIGN PATENT DOCUMENTS

EP          2508235 A2    10/2012

OTHER PUBLICATIONS

International Search Report and Written Opinion issued in related PCT/US2024/054946 on Apr. 2, 2025; 17 pages.
(Continued)

*Primary Examiner* — Lawrence S Galka
(74) *Attorney, Agent, or Firm* — Kilpatrick Townsend & Stockton LLP

(57) ABSTRACT

Methods and systems for providing audio synchronization control for game scenes of a game includes receiving audio data that is identified for defining the audio synchronization control desired for the game. The audio data is processed to identify a language spoken in the audio signal and to determine characteristics of the audio signal by extracting keywords spoken in the audio signal. A correlation between the keywords is determined and used to identify a sentiment expressed in the audio signal. A subset of the characteristics including the sentiment is provided as input parameters to a game logic. The input parameters include audio synchronization control usable by the game logic to control at least some interactions between two or more assets rendering in one or more game scenes of the game.

20 Claims, 6 Drawing Sheets

(58) Field of Classification Search
CPC ...... A63F 13/5375; A63F 13/63; A63F 13/65;
A63F 13/79; A63F 13/847; A63F 13/86;
A63F 13/87; A63F 2300/5553; G06V
40/174; G06V 40/20; G06V 20/20; G06V
10/70; G06V 10/82; H04N 7/157; G10L
25/63
See application file for complete search history.

(56)                     References Cited

U.S. PATENT DOCUMENTS

| | | | |
|---|---|---|---|
| 2010/0029384 A1 | 2/2010 | Andersen et al. | |
| 2017/0173454 A1 | 6/2017 | Begum et al. | |
| 2018/0308487 A1* | 10/2018 | Goel .................. | G10L 15/1815 |
| 2020/0038750 A1 | 2/2020 | Kojima | |
| 2020/0289934 A1 | 9/2020 | Azmandian et al. | |
| 2021/0295578 A1* | 9/2021 | Lee ......................... | G06V 40/23 |
| 2023/0021339 A1* | 1/2023 | Bosnak ................... | G06T 13/40 |
| 2023/0125036 A1 | 4/2023 | Volum et al. | |
| 2023/0316617 A1* | 10/2023 | Watanabe ........... | A63F 13/5255 |

OTHER PUBLICATIONS

U.S. Appl. No. 18/530,128, "Non-Final Office Action", Nov. 18, 2025, 12 pages.

* cited by examiner

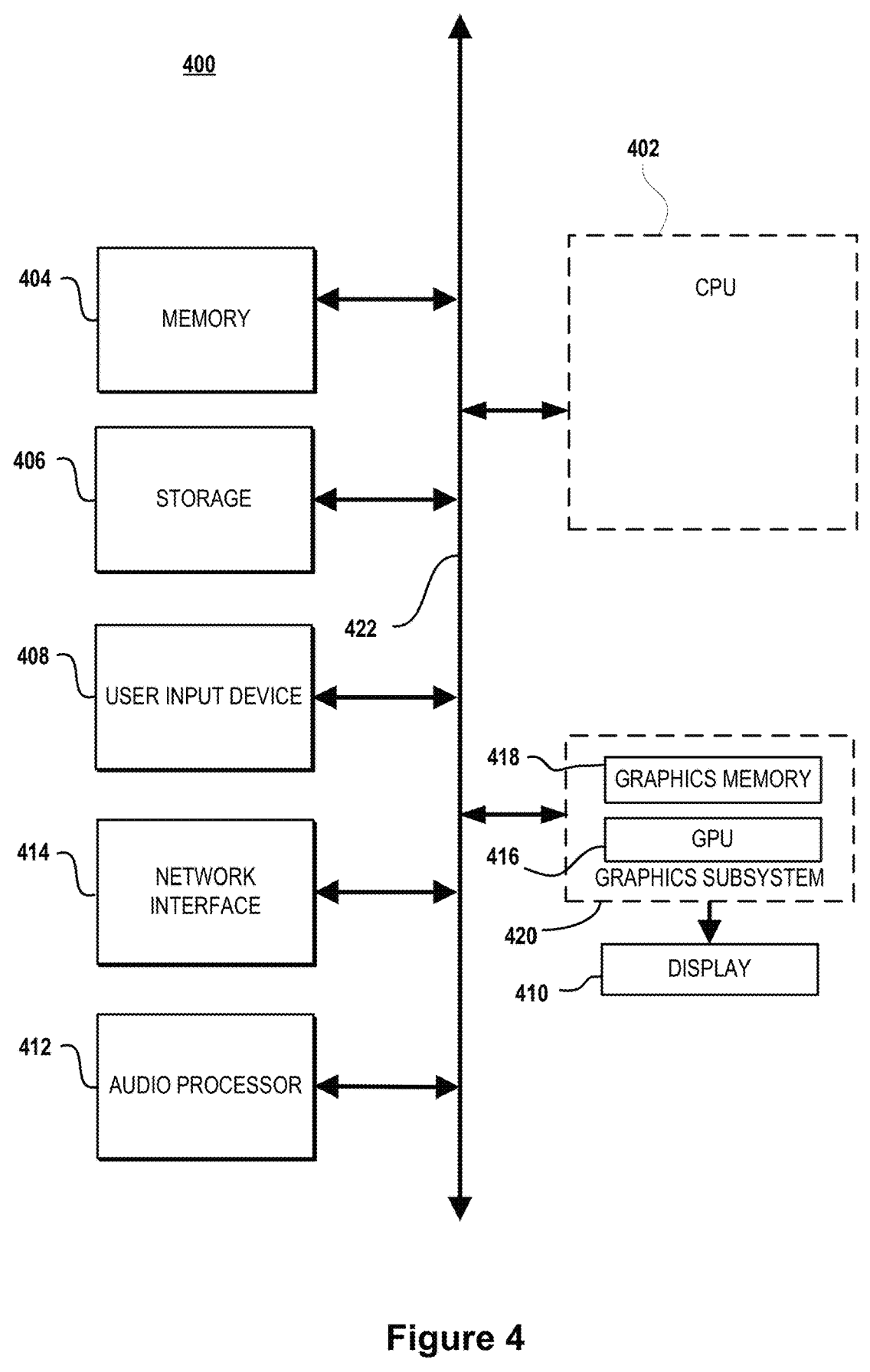

400

402

404 MEMORY

406 STORAGE

408 USER INPUT DEVICE

422

414 NETWORK INTERFACE

412 AUDIO PROCESSOR

CPU

418 GRAPHICS MEMORY

416 GPU

420 GRAPHICS SUBSYSTEM

410 DISPLAY

Figure 4

METHODS AND SYSTEMS FOR PROCESSING AUDIO SIGNALS TO IDENTIFY SENTIMENTS FOR USE IN CONTROLLING GAME ASSETS

CROSS REFERENCE TO RELATED APPLICATION

This application is related to commonly assigned, U.S. patent application Ser. No. 18/530,128, entitled, "Methods and Systems for Processing Audio Signals for Controlling Game Assets," filed concurrently with the present application, the disclosure of which is hereby incorporated by reference in its entirety.

TECHNICAL FIELD

The present disclosure relates to processing audio signals for controlling interaction of assets within game scenes of a video game and more specifically to using sentiments to control interaction of the assets.

BACKGROUND

2. Description of the Related Art

User interaction with online content has become mainstream with a variety of content being presented or generated for user consumption. Of particular interest is the growing popularity of video games. A user selects a video game for playing and provides game inputs to affect a game state of the video game and to update game data. The updated game data is used to generate game scenes for rendering at the client device. The game data that is provided is driven by game logic of the video game with inputs from the user. During play of the video game, if the user wishes to customize reaction of any game asset, the user is unable to provide such customization as the reactions of the game assets is controlled by game logic of the video game.

It is in this context that embodiments of the invention arise.

SUMMARY OF THE INVENTION

Implementations of the present disclosure relate to systems and methods for processing audio data to identify characteristics and to use select ones of the characteristics as audio input parameters for influencing behavior or interaction of two or more assets within a video game that the user is currently interacting with. The audio data can be generated by the action(s) of the user (e.g., clapping, whistling, humming, etc.,) or actions of other users (e.g., spectators or other players playing the game with the user (e.g., in a multi-player game)). The other users can be in the vicinity of the user or are located remotely from the user and are participating in the video game played by the user (as co-players or spectators). Alternatively, the audio data may be selected by the user from the user's own playlist or from music and/or audio sharing application or an audio source available to the user. The audio data may also be ambient sound (e.g., background music) that is rendering in the vicinity of the user when the user is playing the video game and can be audibly heard by the user. The ambient sound can be captured using microphones disposed in the environment of the user.

One or more of the audio input parameters are used as audio synchronization control to control at least some movements and/or interactions between at least the two assets that are present in the one or more game scenes of the game. The at least two assets may be non-playing characters (NPCs).

The audio data captured or provided during game play of the video game includes an audio signal and other details (e.g., metadata) defining the audio signal. The audio signal can be an analog signal or a digital signal. When the audio signal is an analog signal, the analog signal is converted to a digital signal prior to processing the content contained within. When the audio signal is a digital signal, the digital signal is processed without undergoing any conversion. The converted digital signal is processed by first identifying a language spoken in the audio and then interpreting the spoken content of the audio, in accordance to the language, to identify characteristics of the audio signal. A plurality of processing algorithms/modules, such as language learning module (also referred to herein as "language processing module"), a voice recognition module, one or more signal processing algorithms/modules (e.g., Fast Fourier Transform (FFT), discrete Fourier Transform (DFT), etc.), etc., are used to identify the audio signal characteristics. From the identified audio signal characteristics, a subset of the characteristics is selected and provided to the game engine executing a game logic of the video game, so as to influence interactions between two or more assets rendering in the game scenes of the video game. The characteristics identified in the subset are capable of being interpreted by the game logic of the video game. The interactions are synchronized between the two assets and with the one or more of select ones of the characteristics (e.g., beat, pace, etc.) identified for the audio signal.

In one implementation, a method for providing audio synchronization control for game scenes of a game (i.e., video game) is disclosed. The method includes receiving audio data identified for defining audio synchronization control desired for the game. Interactivities in the game scenes of the game are controlled using user input received from the user when playing the game. The audio data received during play of the game by the user is processed to identify a language spoken in the audio signal and to determine other characteristics of the audio signal. The processing includes extracting keywords spoken in the audio signal and determining a correlation between the keywords. The correlated keywords are interpreted in accordance to the language spoken to identify sentiment expressed in the audio signal, wherein the sentiment is defined as one of the characteristics of the audio signal. A subset of the characteristics of the audio signal including the expressed sentiment and one or more audio synchronization controls, is provided as input parameters to game logic of the game. The input parameters including the one or more audio synchronization controls are usable by the game logic to control at least some interactions between two or more assets being rendered in one or more game scenes of the game. The audio synchronization control acts in an aware mode to control synchronization of at least some of the interactions between the at least two assets in accordance to the sentiments expressed in the audio signal.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

The disclosure may be better understood by reference to the following description taken in conjunction with the accompanying drawings.

FIG. 4 illustrates components of an example system that can be used to process requests from a user, provide content and assistance to the user to perform aspects of the various implementations of the present disclosure.

DETAILED DESCRIPTION

Figure 1:
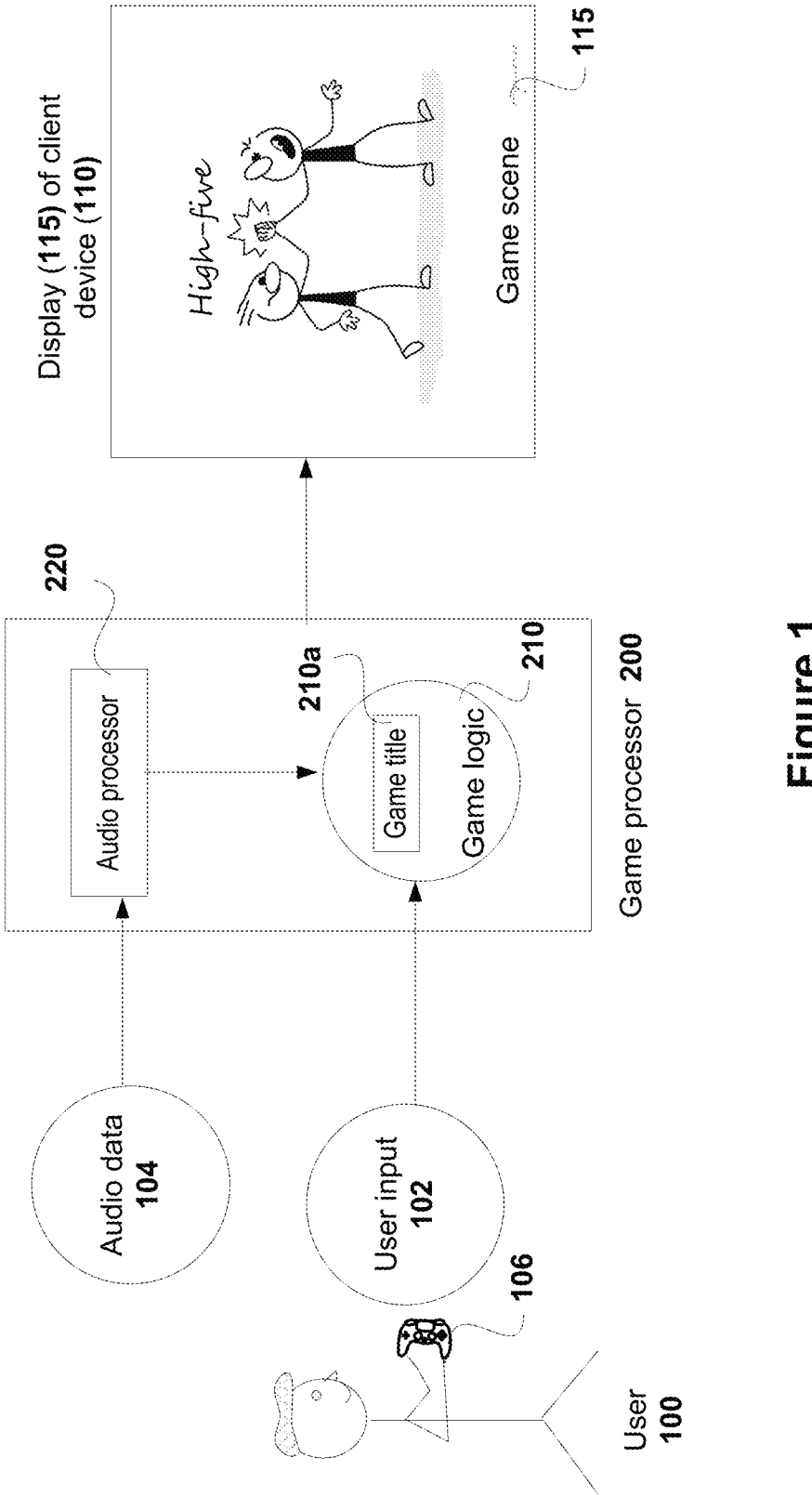
FIG. 1 represents a simplified block diagram of a system that is used for providing audio synchronization control in game scenes of a game, in accordance with one implementation.

Broadly speaking, implementations of the present disclosure include systems and methods for receiving audio data, analyzing the audio data to determine characteristics, and using the characteristics of the audio data to synchronize at least two assets rendered in one or more game scenes of a game played by a user. The game can be executed locally at a game console or can be executed remotely on a server of a cloud gaming site and game scenes representing game state forwarded to a display of a client device of the user for rendering. The audio data can be generated or shared by the user playing the game or by other users playing the game with the user or spectating the game of the user, or can be music or audio rendering in the background while the user is playing the game. The audio data includes an audio signal that is rendered so as to be distinctly audible to the user and can be captured by microphones distributed in the environment where the user is playing the game and provided to a game engine of the game for processing. The audio data can also include additional information related to the audio signal, such as the metadata. The game engine receives user inputs during play and provides the user inputs to game logic of the game to update a game state and adjust game scenes, which are returned to the client device of the user for rendering. In the various implementations discussed herein, in addition to the game inputs, the game engine also receives some characteristics of the audio signal as input parameters. The input parameters are identified by filtering the characteristics of the audio data to identify select ones of the characteristics that can be interpreted by game logic of the game executed by a game engine to control changes in the interactions of assets that are rendered in one or more game scenes. The select ones of the characteristics can include descriptive characteristics and at least one temporal characteristic. The descriptive characteristics are used to define the audio data. The temporal characteristic is used to identify game context of current game state. The game engine uses the input parameters and game context associated with current game state of the game to identify at least two assets that are rendered in the one or more game scenes and control changes in interaction of the at least two assets. Specifically, the game context is used by the game engine to understand the relative position and direction of movement of the assets within the game scenes of the game. Based on the relative position and direction of movement (if any) of the assets, the game engine can then determine the extent of changes in the interactions that can be imparted to the at least two assets and provides the necessary signal to the game logic of the game to impart the changes to the assets within the game scenes. The changes in the interactions imparted to the two assets are controlled so as to synchronize between the two assets and in accordance to the input parameters.

The audio data is external to and separate from the audio provided within the game. The user can select any type of game and use the characteristics of the audio data to influence the behavior between two or more assets that are available in the game scenes of the game currently being played by the user when the audio signal is being rendered. In some implementations, the audio signal can be processed using a machine learning (ML) algorithm, which builds an artificial intelligence (AI) model using the details from the audio data and the game context of the game to identify the characteristics associated with the audio data that can be used to influence interactions between the at least two assets, identify the type of interactions to impart to the at least two assets, and to identify audio synchronization control(s) to control the interactions of the identified type. In some cases, additional characteristics can be derived from the identified characteristics and included as input parameters provided to the game engine to influence the interactions between the at least two assets. The additional characteristics can be derived by the ML algorithm. The ML algorithm builds and trains an artificial intelligence (AI) model by engaging additional models or algorithms, (e.g., voice recognition model, language learning model, fast Fourier Transform (FFT), discrete Fourier Transform (DFT), variations of Fourier Transforms, and other signal processing algorithms and/or models) to process the audio signal in order to identify the characteristics. In addition to the various signal processing algorithms and/or models, a filtering module can also be engaged to selectively filter the characteristics of the audio signal so as to identify select ones of the characteristics of the audio data that can be understood by the game engine to control interactions of the at least two assets of the game. In some implementations, the select ones of the characteristics provided to the game logic executed by the game engine includes at least a temporal characteristic of the audio signal and descriptive characteristics associated with the audio data.

As the characteristics of the audio signal varies over time and as the game content within game scenes vary over time, the select ones of the characteristics used to influence the interactions of the at least two assets also vary. Consequently, the extent of changes in the interaction of the at least two game assets also vary over time. The interactions can be movement of select portions of the game assets and the select ones of the characteristics are used to identify the extent of movement and to synchronize the movement of the select portions of the at least two assets. For example, the assets may be non-player characters (NPCs) that are walking toward each other within the game scenes currently rendering at the client device of the user. The select ones of the characteristics can be used to dynamically control the two NPCs to perform a "high-five" action between them or adjust their stride so as to include a swagger or adjust a speed of their walk or have a dialog that is synchronized between the two NPCs and in accordance to at least some of the characteristics (e.g., the beat or rhythm or pace) of the audio signal provided as input parameters. The adjusting of the interactions of the two NPCs means adjusting the stride of the two NPCs so as to coordinate movement of the stride attribute to match the characteristics of the audio signal. Alternately, the speed of walk or dialog exchanged between the two NPCs or any other interactions can be adjusted to match the characteristics of the audio signal.

In some implementations, the user is provided with options on a user interface to select a source of the audio and/or the type of audio the user wishes to use to control interactions between or of the at least two assets within game scenes of a game. In some other implementations, the user may themselves provide the audio (e.g., via whistling, humming, tapping, clapping, beat-boxing, playing a musical instrument, etc.) and the audio signal associated with the user-generated audio can be processed to determine the fundamental harmonics. The fundamental harmonics can be used to identify the characteristics of the audio that can be used to adjust the behavior of the at least two assets (i.e., game elements) within the game scenes. In some implementations, the user providing the audio can be a spectator or a group of spectators who is watching the game play of a player (i.e., another user) or can be the user playing the game or another user(s) who is playing the game with the user. In some implementations, instead of or in addition to adjusting the behavior of assets in the game scenes, the characteristics of the audio can be used to control changes in color or vibes within the game scenes. The color or vibes are reflective of a mood or sentiment associated with the audio signal. In some implementations, the audio generated by the user can be selected by other users either playing the game with the user or watching the game play of the game of the user and the live audio generated by the user(s) can be used to adjust the interactions between the assets in the game scenes of the game. In place of or in addition to the beats, pace, etc., the tone of the lyrics of the audio can also be used to influence behavior between the two assets in the game scenes of the game. For example, the tone of the lyrics can identify the general mood of the user or the ambience of the environment in which the user is present and the interactions between the at least two assets are controlled in accordance to the general mood. The various implementations enable the users to incorporate their preferred audio elements into the gaming experience and leveraging AI technology to dynamically adjust game parameters and synchronize gameplay with the selected audio, resulting in a more immersive and synchronized gaming experience.

With the general understanding of the disclosure, specific implementations of using audio data provided to a game engine to synchronize interactions between at least two assets in game scenes will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 represents a simplified view of a system used for receiving and processing audio data and using the processed audio data to synchronize interactions between two or more assets present in game scenes of a game, in some implementations. User 100 can access a user account of the user and select a game title 210a of a game available to the user. The game title 210a can be associated with a game that is a single player game or a multi-player game. The user account can be accessed locally on a computing device or a console (e.g., game console) or remotely on a server over a network, wherein the server can be part of a cloud system. The implementations will be discussed with reference to a remote server as the computing device for executing game logic of the selected game title 210a, but can be easily extended to a local computing device (e.g., local game console) for executing the game logic of the selected game. The server includes a game processor 200 for supporting a game engine (e.g., software framework) usable for executing the game logic 210 of the game and an audio processor 220 to process the audio data. In some other implementations, a portion of the game is executed on the remote server and the remaining portion is executed on a local computing device (e.g., game console—not shown), with the game data synchronized between the local computing device and the remote server. Responsive to the user selection of the game title 210a of the game for game play, game logic 210 of the game is executed by the game processor 200 at the computing device using the resources/framework provided by the game engine. User interactions provided by the user 100 using inputs devices, such as keyboard (not shown), controller 106, etc., are used as user inputs 102 to the game. The user inputs are applied by the game logic 210 to update a game state of the game, and game scenes are generated for the game. The game scenes are returned to the client device 110 as streaming game content for rendering on a display 115 associated with the client device 110.

During game play of the game by the user 100, audio data 104 can be provided to the game logic 210 for use in synchronizing interactions between assets present within game scenes of the game. The audio data 104 can pertain to music audio provided or selected by the user/other users (100) while the user 100 is playing the game or can be associated with audio rendering in the background of the user 100 while the user 100 is playing the game. The rendered audio is distinctly audible so that microphones distributed within the environment of the user 100 can detect and capture the audio. The audio data 104 captured by the microphones is transmitted to the audio processor 220 for processing. The audio processor 220 processes the audio data to identify characteristics of an audio signal contained within. Select ones of the characteristics of the audio signal are identified and provided as input parameters to the game logic. The characteristics of the audio signal that are provided as input parameters are identified so that the game logic 210 can interpret the input parameters. The game logic 210 processes the input parameters of the audio signal in accordance to the game context of the game, identifies two or more assets present within the game scenes whose interactions can be synchronized, the asset attributes of each of the two or more assets present within the game scenes, wherein the asset attributes can be used to determine their relative positions with respect to one another and/or actions within the game scenes, the type of interactions that can be synchronized between the identified assets based on their relative positions and/or actions within the game scenes, and generates one or more audio synchronization controls to provide appropriate signals to control the interactions of the assets. The audio synchronization controls ensure that the interactions between the assets are synchronized and align with at least some of the input parameters (e.g., beat, pace, etc.). The processing of the input parameters and the generation of the audio synchronization controls to adjust interactions between the assets are done while the user is playing the game. The synchronized interactions between the assets are returned with the other game data representing the game scenes to the client device 110 of the user 100 for rendering. In cases where the game play is between two or more users and/or being watched by other users, the game scenes with the synchronized interactions between the assets are also provided to the corresponding client devices of the other users.

FIG. 1 shows one such implementation, wherein the game logic 210 has identified two assets (Non-player characters (NPCs)) based on their relative position and movement in relation to one another. The movements of the two assets is synchronized using the signals from the audio synchronization controls to show them high-fiving one another as they pass one another. The movements of the assets and the high-fiving actions between the two assets are synchronized to align with the beat or pace or speed of the audio included in the input parameters provided to the game logic 210. The game scenes with the synchronized movement of the assets are forwarded to the display 115 of the client device 110 of the user 100 for rendering.

Figure 2:
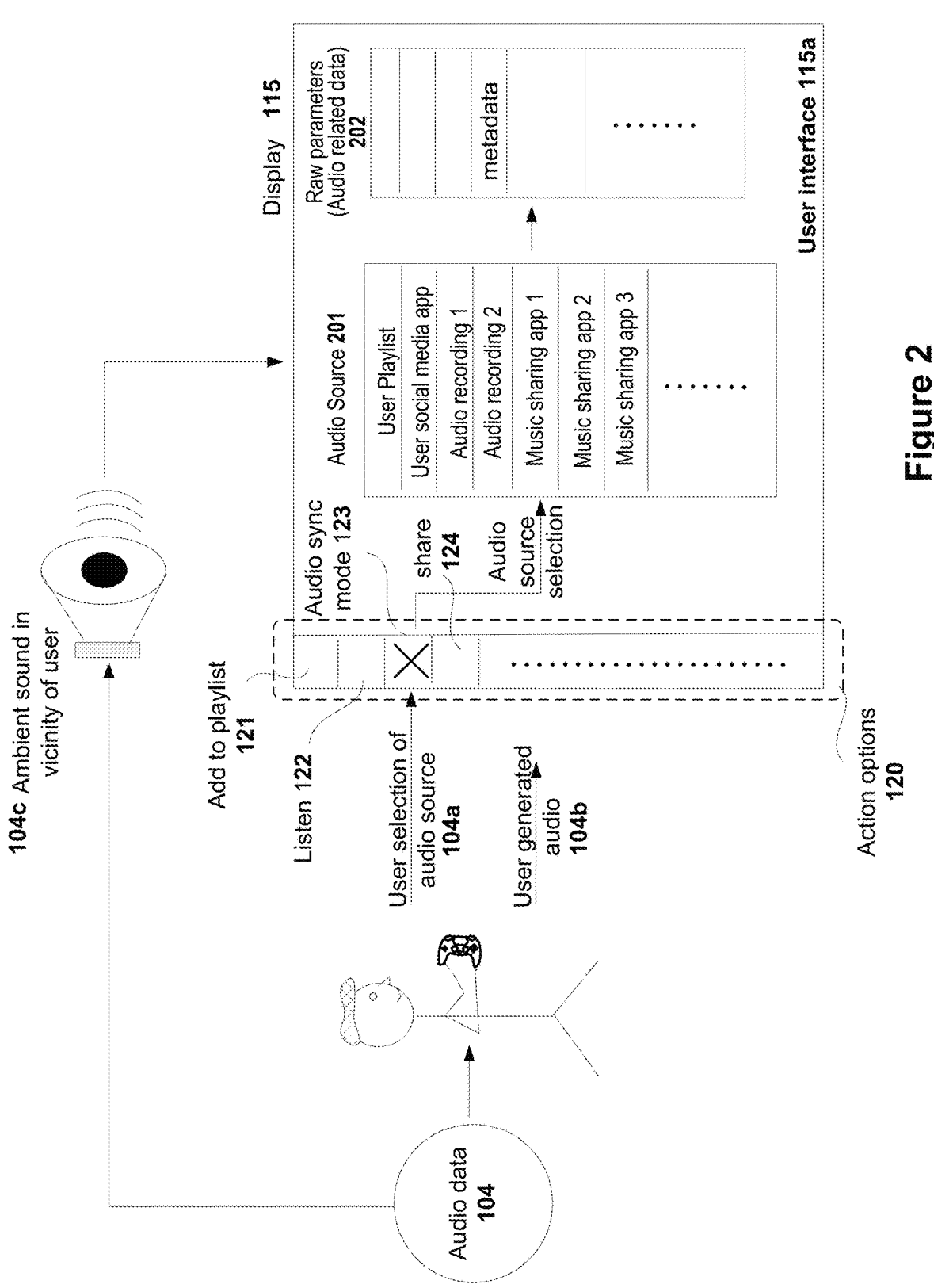
FIG. 2 provides a simplified view of various sources of audio data that is usable for providing audio synchronization control of at least two assets rendered in game scenes of the game, in accordance with one implementation.

FIG. 2 shows examples of audio data that can be used to provide audio synchronization control to synchronize movement of assets within game scenes of a game, in some implementations. The audio data used to synchronize interactions of two or more assets within game scenes can be broadly classified into audio content 104a selected from an audio source 201 and shared by the user/other users, audio content 104b generated by the user/other users based on user actions, and audio content 104c rendering in the background of the user (i.e., ambient sound). The audio source 201 from which the audio content 104a is selected by the user, in some implementations, can be the user's own playlist, or a social media application, or an audio recording saved on the user's computing device or a compact disk (CD) or other recording/rendering device, or a music sharing application, or a podcast, an audio content provider website from which to retrieve the audio content 104a using a link, etc. The audio related to audio content 104b can be generated by the user/other users by performing some actions, such as clapping, whistling, humming, singing, beat-boxing, playing on a musical instrument, etc., and such audio is distinguishably audible to enable the one or more microphones disposed in the real-world environment of the user to detect and capture. The audio generated through actions of the user can be picked up and replicated by other users. For example, the user can be a spectator watching game play of another user, and the action of the spectator generating the sound could be a clapping action. The clapping action of the spectator can be picked by other spectators who are also watching the game play of the game and the audio of the clapping by the group of spectators are detected and captured by the microphones distributed in the real-world environments of the spectators. Where the spectators are distributed across different geo-locations, each spectator can be clapping in tune with the other spectators and each spectator's clapping can be captured by a microphone in the respective location and provided to the game logic 210 for processing. Further, each spectator's clapping can be used to amplify the overall clapping sound such that the volume of the clapping can be indicative of the number of spectators providing the clapping sound.

The ambient sound (i.e., audio content rendering in the background) 104c can be a music track that is being rendered over speakers located in a real-world environment in the vicinity of the user, for example. The ambient sound can be picked up by one or more microphones located within the computing device and/or the controller and/or other input devices and/or disposed in the real-world environment, and transmitted to the computing device that is executing the game logic and the audio processor, wherein the microphones are communicatively coupled to the computing device (either local or remotely located computing device) to enable such transmission of audio data.

Not all audio data generated or shared by the user or rendered in the background are used for synchronizing interactions of assets in the game scenes. Consequently, a user interface 115a is provided at a display 115 associated with the client device 110 with various user selection options for the audio data. The selection options represent "action" options 120 as the selection options determine how the audio data is to be used. In some implementations, selection of certain one(s) of the action options 120 automatically identify and present one or more options of audio sources (i.e., audio source options) 201 for user selection of the audio. Although not shown in FIG. 2, the user interface 115a can also be used to render game scenes of a game selected by the user for game play or for spectating while simultaneously rendering the audio source options (201) for selecting the source of the audio and the action options (120) for expressing the user's intent for the selected/generated/ambient audio. Some of the action options 120 available for the audio data 104 can include, "Add to playlist" option 121, "Listen" option 122, "Audio sync mode" option 123, "Share" option 124, etc. For instance, the "Add to playlist" option 121 is provided to allow the user to add the selected or generated audio to the user's playlist, for example. Similarly, the "Listen" option 122 is provided to allow the user to just listen to the selected/generated/ambient audio. The audio sync mode option 123 is provided to allow the user to use the selected or generated or ambient audio to provide synchronization control for synchronizing assets identified in the game scenes of a game the user has selected to play or spectate. The "Share" option 124 is provided to allow the user to share the selected or generated audio with other users. The aforementioned action options 120 are provided as mere examples and other action options 120 can also be envisioned. The user interface 115a with the various action options 120 and audio source options 201 may be provided to the user in response to the user selecting a game title of the game for game play or for spectating.

The audio data 104 from anyone of user-selected audio 104a, user-generated audio 104b and ambient audio 104c includes audio signal and, in some cases, audio related data. Based on the audio source 201 selected, the audio signal can be an analog signal or a digital signal. For example, the user can select the audio source to be a music sharing app 1, such as "Pandora™" or "Spotify™" from the audio source options 201 and share the selected audio data with other users by selecting the "Share" option 124 from the action options 120 or use the selected audio data to synchronize assets within game scenes by selecting the "Audio sync mode" option 123 from the action options 120. The music sharing app 1, in some implementations, provides audio related data 202 in the form of a digital signal 104Di and metadata (104M) related to the digital signal (104Di). Responsive to selection of the Audio sync mode option 123, the audio processor 220 downloads (i.e., retrieves) the audio related data 202 from the music sharing app 1. The metadata (104M) includes descriptive characteristics associated with the audio signal (i.e., digital signal 104Di). A language spoken in the audio signal is identified and the textual data included in the audio signal is interpreted in the language spoken in the audio signal. The interpreted textual data and the descriptive characteristics of the audio signal included in the metadata (104M) are provided to the audio processor 220 as inputs, which uses the inputs to define audio synchronization controls to control interactions between at least two assets within the game scenes of the game currently rendering at the user interface 115*a*.

In the case where the audio signal is an analog signal, the audio related data 202 can include some data related to the analog signal, such as the audio source. Based on the audio source and the analog signal identifier, other audio related data can be provided by the user or can be retrieved from the Internet, for example. The audio data 104 including the audio source 201 details, the audio signal, and other audio related data 202 are provided to the audio processor 220 as inputs. The audio processor processes the audio data inputs to identify characteristics of the audio signal included in the audio data and use select ones of the characteristics of the audio data to influence interactions between at least two assets identified in the game scenes currently rendering at the user interface 115*a* rendered on the display 115 of the client device 110. The select ones of the characteristics of the audio data include descriptive data that provides details of the audio data and at least one temporal data that can be used to match the audio data to corresponding game scene. The game scene is useful in obtaining current game state and the game context of the game. The current game state and the game context are used to identify the assets that are present in the game scene and the attributes of the assets that can be used to synchronize movement of the assets to correspond with the audio synchronization control.

Figure 2A:
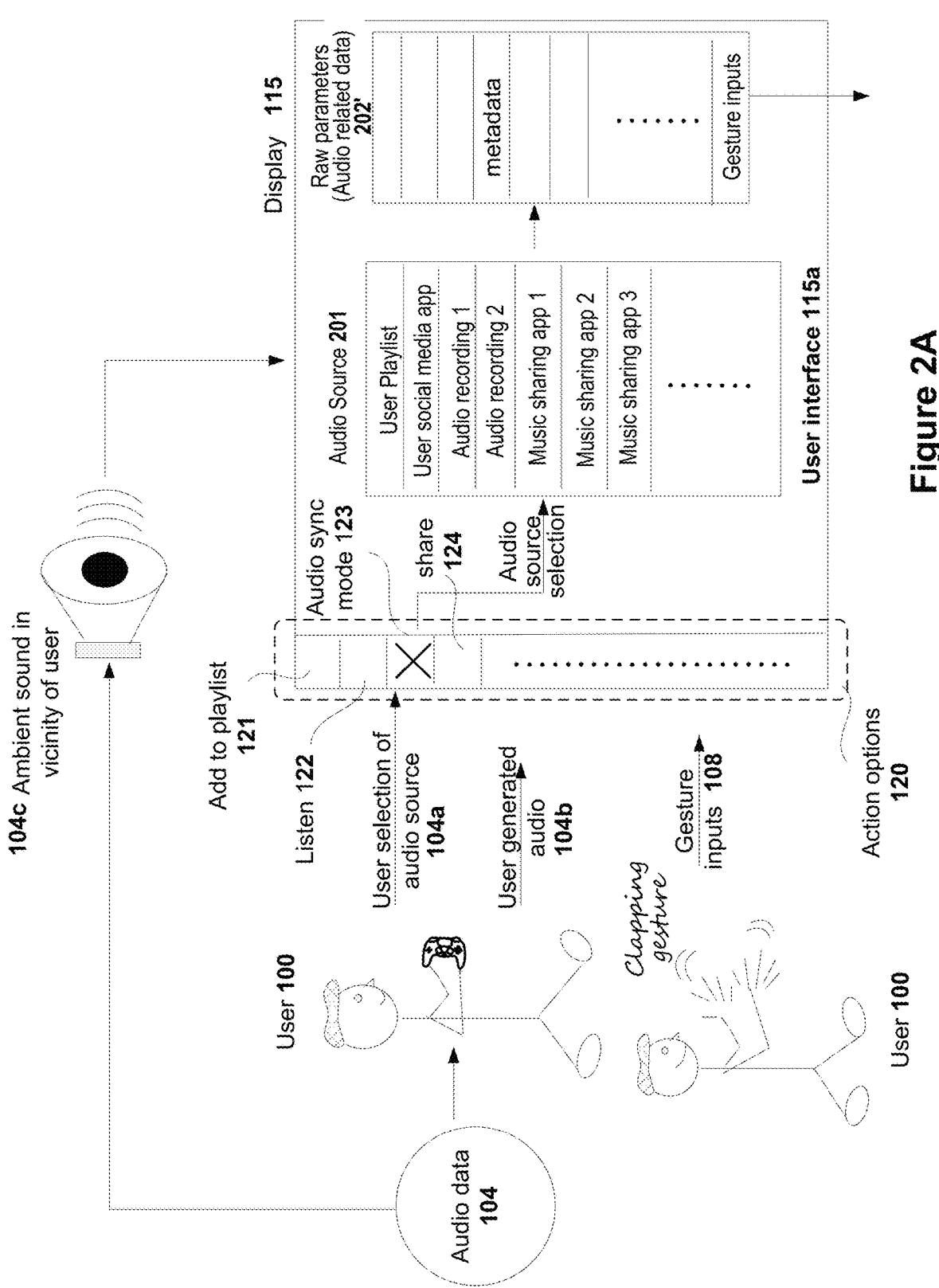
FIG. 2A provides a simplified view of various sources of data that is usable for determining sentiments associated with the audio signal and using the sentiments with other audio characteristics of the audio signal to provide audio synchronization control of at least two assets rendered in game scenes of the game, in accordance with an alternate implementation.

FIG. 2A illustrates additional data that is used to provide audio synchronization control to synchronize movement of assets within game scenes of a game, in some alternate implementations. In addition to the different sources of audio data identified in FIG. 2, the game engine executing the game logic 210 of the video game can also receive and use gesture inputs provided by the user to control synchronization of interactions between game assets in the game scenes of the video game. The gesture inputs provided by the user during play of the video game can be captured using one or more image capturing devices, such as cameras, located in the real-world environment where the user is present and is interacting with the video game. As noted, the user can be a player or a spectator of the video game. The user can be providing gestures that are in tune with the beats or pace of the audio signal that is rendering during play of the video game by the user. The gestures can be in the form of clapping, finger snapping, stomping, tapping with the fingers, waving, or can be in the form of dancing, and such gestures provided by the user can be following the pace or beats of the audio signal generated or shared by the user or rendering in the background. The user provided gestures are forwarded as gesture inputs 108.

In some implementations, the user can initiate the synchronization control by selecting the audio synchronization mode 123 at the user interface 115*a* during play of the video game. In alternate implementations, the audio synchronization mode 123 is automatically selected by the audio processor 220, in response to detecting the audible audio signal generated or shared by the user or rendered in the background of the user during game play of the video game by the user. In some cases, the automatic selection may be based on the options selected by the user and recorded in their user profile settings. Upon detecting selection of the audio synchronization mode 123, the audio related data (i.e., audio signal, metadata, and other audio signal related data)

as well as the gesture inputs 108 of the user captured by the image capturing devices are provided to the audio processor 220 as audio related data 202' for further processing. The audio related data 202' of FIG. 2A differs from the audio related data 202 of FIG. 2 in that the audio related data 202' includes gesture inputs capturing details of the gestures provided by the user 100, in addition to the other audio related data 202, which includes audio signal, metadata, etc. In the example of FIG. 2A, the user 100 is shown to be providing clapping gesture. Other forms of gestures (e.g., finger snapping, stomping, tapping, waving, etc.,) can also be considered in addition to or instead of the clapping gesture. In some implementations, the details of the gestures captured in the gesture inputs 108 also include audio component associated with the gestures. For example, in the case where the user is providing clapping or stomping or tapping gestures or finger snapping gestures, the sound produced by the clapping or stomping or tapping or finger snapping gestures is also captured and forwarded to the audio processor 220.

The audio processor 220 uses machine learning 320 to process the audio related data 202', which includes the audio data inputs and the gesture inputs, to identify characteristics of the audio signal. In the implementations illustrated in FIG. 2A, select ones of the characteristics of the audio signal used to identify one or more audio synchronization controls include one or more gesture-related characteristics. The audio synchronization controls influence interactions of the two or more assets, which may or may not be between the at least two assets. In one example, the interactions of the at least two assets can be a high-five gesture or a hand-shake gesture, wherein the assets or NPCs. In this example, the audio synchronization controls can be used to synchronize the movement of the two assets and the hands of the two assets to accomplish the high-five or hand-shake gestures between the two assets. In another example, the interactions of the two assets can be controlled to perform a dance move and the audio synchronization controls can be used to coordinate the dance steps of the two NPC assets so that they complement each other's dance steps. As previously stated, the audio synchronization controls, in some implementations, are operated in the aware mode. In the aware mode, the relative positions and motions of the at least two assets with respect to one another are determined from the game context and used for controlling synchronization of the interactions of the identified assets. The audio synchronization control provides the beat, the pace, the rhythm, etc., to which the interactions of the assets are synchronized.

In some implementations, the audio synchronization controls can be used to adjust interactions of assets in the game scenes for a game that was already played. In these implementations, a recording of the game play of the game is used to adjust the interactions. For instance, a user (e.g., spectator) can select a recording of the game play for viewing and while the user is viewing the recording, the audio inputs from the audio signal generated or shared by the user or rendering in the background can be used to adjust the interactions between the two or more assets currently rendering in the game that is being viewed by the user. The synchronized interactions influenced by the audio input can be recorded and saved as a secondary recording for the video game for subsequent viewing.

In some implementations, the audio data generated or shared by the user or provided in the background is used to determine the sentiment expressed in the audio signal. The expressed sentiment is provided as another audio input to the audio processor 220. The sentiment extraction and process-
ing will be discussed in more detail with reference to FIG.
3.

Figure 3:
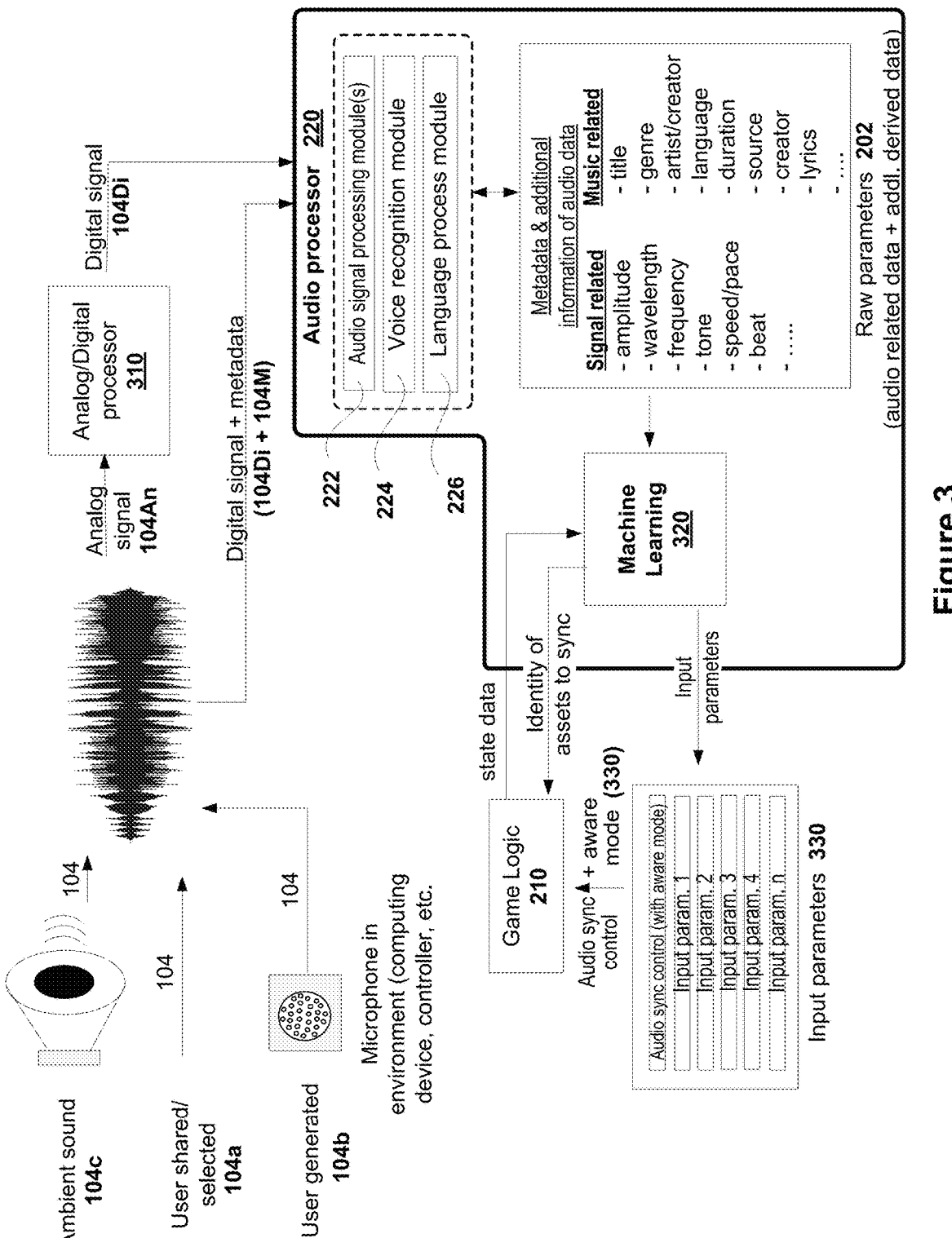
FIG. 3 represents a simplified process flow of audio data used to provide audio synchronization control to control at least some interactions of at least two assets rendered in one or more game scenes of a game, in accordance with one implementation.

FIG. 3 illustrates process flow of using the audio data
(104a or 104b or 104c) selected or provided by the user for
synchronizing interactions between two or more assets
within game scenes of a game during game play by the user,
in some implementations. The synchronization of interac-
tions between the two or more assets is based on input
parameters identified from the audio data that is provided to
the game logic 210. The audio data captured is analyzed to
first determine if the audio (104 from any one of sources
104a, 104b or 104c) includes an analog signal (104An) or a
digital signal (104Di). If the audio signal is an analog signal
(104An), such as music or recording reproduced from a tape
or a vinyl record or streamed from a radio, etc., the analog
signal 104An is forwarded to an analog-to-digital processor
310 for conversion to a digital signal 104Di. The analog-
to-digital processor 310 is communicatively coupled to the
client device to receive the analog signal 104An, and to the
audio processor 220 executing on a server computing device
either directly or over the network, such as the Internet, to
provide the converted digital audio signal 104Di along with
other audio signal related data for processing. In alternate
implementations, the analog-to-digital processor 310 is inte-
grated into the audio processor 220.

If, however, the audio signal is a digital signal, such as an
audio from a music sharing application (e.g., MP3 audio in
Motion Pictures Expert Group (MPEG) Audio Layer III
format, etc.), then the digital signal 104Di and any metadata
104M associated with the digital signal is provided to the
audio processor 220 as audio related data 202 for processing.

The audio processor 220 processes the audio signal in
digital format and other audio related data 202 to identify the
"raw" parameters of the audio signal. The audio processor
220 can engage one or more processing algorithms/modules
to process the audio related data. The audio processor 220
can engage a language process module 226 to identify the
language spoken in the audio signal. The language plays a
key part in determining how the audio content included in
the audio signal is to be interpreted. For example, the spoken
content can be interpreted in a first language (e.g., French or
Italian) very differently than when it is interpreted in a
second language (e.g., English), as the first language may
consider the nuances of the sentiment expressed in the
spoken content while in the second language the nuances of
expressed sentiment are not considered. This can especially
be the case when the spoken content in the audio language
is translated from one language to another, as the sentiment
expressed in one language is usually lost during translation.
The language process module 226 can, in some implemen-
tations, be a generative artificial intelligence (AI) module,
which performs various tasks, such as keywords extraction,
keywords classification, language translation and sentiment
analysis in accordance to linguistic rules so as to understand
the nuances of expressions included in the spoken content
and interpret the spoken content correctly.

The audio processor 220 can engage a voice recognition
module 224 to identify a speaker providing content included
in the audio signal. For example, the voice recognition
module can identify the spoken content (e.g., text or speech
or lyrics of a song included in the content) and analyze the
audio to identify if a human or a robot (or "bot") is providing
the content. When the content is from a human, the spoken
content can be further analyzed to identify a singer or a
speaker providing the content, the event or location or
context when the content was generated and/or presented, etc. Similarly, when the content is provided by a bot, the
content can be analyzed to determine the context in which
the content was generated by the bot, the application used to
generate the content, etc. The identity of the speaker and/or
the event can be used in obtaining additional information
related to the audio content included in the audio signal. The
additional information can be useful in identifying addi-
tional characteristics of the audio signal, wherein the addi-
tional characteristics (e.g., metadata that can be used to
define tone, genre, lyrics, etc.) are usable in determining
input parameters for controlling the behavior of certain ones
of the game assets.

The audio processor 220 can also engage one or more
known or proprietary audio signal processing module(s) or
algorithms 222 to perform the signal processing of the audio
signal to identify characteristics of the audio signal, which
are used to define the raw parameters. Some examples of
known audio signal processing algorithms or technologies
that can be engaged by the audio processor 220 include
Fourier Transforms and/or variations of Fourier Transforms
(FT) (e.g., fast Fourier Transforms (FFT), discrete Fourier
Transforms (DFT), etc.), linear equations algorithms, Digital
Signal Processing (DSP), etc. The aforementioned signal
processing algorithms/technologies are provided as
examples and other signal processing algorithms including
proprietary signal processing algorithms can also be
engaged. The signal processing algorithms (e.g., Fourier
Transforms and/or variations of Fourier Transforms, etc.,)
are used to convert the waveform data in the time domain
into the frequency domain, so that various signal features,
such as time domain features, frequency domain features,
wavelength domain features, time-frequency domain fea-
tures, time-wavelength domain features, etc., can be
extracted and used to define the characteristics of the audio
signal. The workload of such signal processing algorithms/
technologies, in some implementations, can be accelerated
by running it on a Graphics Processing Unit (GPU), or a
dedicated Application Specific Integrated Circuits (ASICs).
In some alternate implementations, the signal processing
algorithms/technologies can be run on one or more CPUs, a
combination of CPUs and GPUs, or a combination of CPUs,
GPUs and ASICs. In the various implementations, the terms
features and characteristics are used interchangeably to
define the attributes that uniquely represent the audio signal
and the associated audio content in order to distinguish one
audio signal from another. The various extracted domain
features are used to define audio signal properties represent-
ing fundamental characteristics, such as frequency, ampli-
tude, wavelength, time period, velocity, etc., and additional
characteristics extracted and/or derived from fundamental
characteristics. The additional characteristics may be spe-
cific to the type and context of content included in the audio
signal. The extracted domain features defining fundamental
and additional characteristics are used to predict the behav-
ior of the audio signal, recognize any pattern that exists, etc.

In some implementations, the additional characteristics
can be extracted from metadata embedded with the audio
signal in the audio data. The metadata provides sufficient
details that can be used to distinctly identify the audio signal.
For example, in the case of music audio, metadata included
with the audio signal can be used to identify characteristics,
such as audio signal identifier, tone, beat, lyrics, speed/pace,
genre, title, artist, composer, track number, popularity index,
etc. In cases where metadata is not available (i.e., not
embedded in the audio data), the additional characteristics
can be retrieved from the content source using the audio
signal identifier. In some implementations where the metadata is not included, additional characteristics may be derived from details retrieved from the content source. The results of the processing of the audio data by the different modules of the audio processor 220, such as the language process module 226, voice recognition module 224, audio signal processing module(s) 222 are provided as "raw parameters" 202 to a machine learning (ML) algorithm 320 as inputs for further processing. As the audio data is received and processed by the audio processor 220 during game play of the game while the user or another user (when the user is a spectator or a co-user (e.g., co-player)) is providing game inputs (i.e., user inputs) to the game or during spectating of the game, the ML algorithm 320 receives state data from game logic of the game. The state data identifies the current game state of the game. The game state can be used to determine the game context of the game currently rendering and to identify assets that are currently present in the game scenes of the game.

The ML algorithm 320 uses discretion in determining the type of features (i.e., parameters) to extract from the raw parameters 202 related to the audio signal. In some implementations, the ML algorithm 320 identifies and extracts select ones of the features from the raw parameters 202 that are capable of being interpreted by the game logic 210 to control assets within the game. In FIG. 3, the select ones of the features identified by the ML algorithm 320 are represented as input parameters 330. Select one(s) of the input parameters 330 that are capable of acting in an aware mode are identified and provided as "control parameters" 331 to the game logic 210 for interpretation and control of the assets within game scenes of the game. The control parameters 331 that are capable of acting in the aware mode can stay the same or can vary from one game scene to another within the game and can be based on the input parameters 330 defined from the game context. The game context identifies the type of assets available and the relative position and actions of the assets within the game scenes so as to determine which ones of the assets to control synchronization of interactions and the control parameters that can be used for synchronizing of the assets in the game scenes.

The ML algorithm 320 can also use the select ones of the input parameters 330 of the audio signal to correlate with other similar audio signals to classify and/or enhance certain ones of the features of the current audio signal. For example, the selected input parameters defining the control parameters (i.e., control features) can be used by the ML algorithm 320 to distinguish the different audios included in the audio signal, such as a speech provided by a particular user, music sung by a particular artist, content generated by a robot (i.e., generated using artificial intelligence and used for interacting), instrument music rendering in the environment, etc. The selected features (parameters) can also be used to distinctly identify number and types of sounds included, distinguish between the different sounds (e.g., distinguish between human speech, musical instrument, environmental sound, etc.), and detect and identify each type and source of sound (i.e., sound generated by a first user, speech articulated by a second user, a bot's response to a query, sound generated by a vehicle or an instrument, etc.) included in the audio. These features can be used to selectively enhance certain ones of the features and/or to selectively reduce or cancel certain other ones of the features.

In some implementations, during rendering of audio (e.g., background music), a user can act as a conductor and provide hand gestures. These hand gestures are considered as inputs from the user for adjusting one or more attributes of the gameplay or one or more characteristics of the audio signal. For example, the hand gestures provided by the user can be captured by image capturing devices, in some implementations, interpreted by the ML algorithm 320, and used to adjust the tempo (e.g., characteristics) of the audio signal associated with the audio. The adjusted tempo can, in turn, be used to adjust speed/pace (e.g., attributes) of the gameplay of the video game. The changes in the speed of gameplay are then used to adjust changes in the movement between the at least two assets in the game scenes of the video game. Broadly speaking, the inputs provided by the user through hand gestures are interpreted to identify the type, speed, and extent of the hand gestures, for example, to correspondingly adjust the pace of the gameplay and the interactions between the at least two assets within the game scenes. For example, when the user provides faster hand gestures, the speed of movement of the user's hands are detected, captured and interpreted to increase the speed of the gameplay, and correspondingly increase the speed of movement of or interactions between the two assets in the game scenes.

In some implementations, prior to forwarding the input parameters to the game logic 210, the ML algorithm 320, with the aid of the audio processor 220, is configured to selectively enhance certain ones of the features of the audio signal and/or reduce certain other ones of the features. For example, when the audio signal being processed includes noise, the audio signal is processed to reduce or cancel the noise. Similarly, if the voice of a user providing the content in the audio signal is not audible, the select features of the audio signal associated with the voice can be enhanced to make the voice of the user more audible. In addition to or instead of enhancing the voice of the user, audio of certain frequencies may also be reduced to improve the clarity of the sound of the user. The select ones of the features of the audio signal, including the enhanced features, along with the audio synchronization control and the aware mode are provided to the game logic 210 of the game as control parameters 331.

The ML algorithm 320 also receives state data identifying a current game state of the game from the game logic 210. The state data is provided to the ML algorithm 320 as and when the game state of the game is updated. The current game state of the game is used to identity two or more assets included in one or more game scenes of the game whose interactions can be controlled to synchronize within the game. The synchronization can be controlled so as to be in tune with one or more of the selected features of the audio data. The assets identified can be NPCs or any other type of assets whose interactions can be controlled during game play of the game.

The game logic 210 receives the control parameters and the identity of two or more assets within the game scene(s) of the game. The game logic 210 identifies the one or more audio synchronization controls and the aware mode included within the control parameters 331, wherein the aware mode is defined by interpreting the control parameters 330 in the context of the game. The game logic 210 uses the audio synchronization controls and the aware mode to control the interactions of the assets identified in the current game scene of the game. The aware mode is used to identify the type of interactions that should be imparted to the identified assets, time line and duration for initiating such interactions based on the relative position and movement of the identified assets in relation to one another in the current game scene, the extent of the interactions that needs to be imparted to the identified assets, the sequence that needs to be followed by the assets to complete the interactions, and synchronize the sequence of the interactions (e.g., movements, actions, dialogs, etc.) accordingly. The interactions are synchronized by controlling the sequence and the extent to which the different elements or components of the two assets are adjusted. For example, based on the context of the game scene and the control parameters 330, the aware mode may identify two assets that are NPCs in the current game scene whose interactions are to be synchronized. Further, the aware mode detects the two assets moving toward each other and may determine that the action that needs to be imparted is a high-five action to convey a happy greeting, based on the control parameters 330. The aware mode is used to synchronize the movement of the two assets toward each other, and control the timing of movement of the hands of the two assets as the two assets pass one another so that the hands of the two assets move synchronously to perform the high-five action within the game scene(s) at the appropriate time. The synchronous movement of the two assets toward each other and the hands of the two assets is in accordance to the beat or pace of the audio signal (i.e., one or more of the control parameters 330).

In another example, when two assets are standing next to each other, the aware mode may be used to initiate a dialog between the two assets. In this example, the aware mode may synchronize the dialog exchanged or lip-synching between the two assets to mimic the spoken words or lyrics of music included in the audio signal. In some implementations, a language spoken in the audio signal is used to synchronize the dialog between the two assets. In some implementations, the synchronizing of the dialog may be done along with the synchronization of movement of the two assets such that the synchronizing is in tune with the beat or pace (i.e., select ones of the input parameters) of the audio signal. The audio synchronization control in association with the aware mode is used to provide appropriate signals to the game logic 210 to control synchronization of various aspects of the two assets, (e.g., synchronize the walk of the two NPC assets, the pace, the style (e.g., with matching swagger or bounce in their steps), etc.), as the two assets (e.g., NPCs) walk toward or with each other, while talking or singing to the pace or beat of the audio signal.

In some implementations, in addition to synchronizing the interactions between the assets, the synchronization control can be used to adjust the color or look of the game scenes to visually convey the mood or emotion expressed in the audio signal. In some implementations, the audio can be from actions of the user (e.g., clapping, beat-boxing, etc.) and the tone of the audio, for example, can be of a particular intensity. Further, as time goes by the tone of the audio can change—i.e., either increase or decrease. The synchronization control can detect the change in the tone and adjust the interactions between the two assets within the game scenes to match the tone of the audio provided by the user.

In some implementations, the genre, the sentiment/mood expressed, and subject matter of the audio signal can be fed into a visual re-skinning system using Neural Radiance Fields (NeRFs) based system for adjusting the interactions between the game assets. The NeRFs based system is used to construct three-dimensional (3D) representation of the video game scene from two-dimensional (2D) images. In some implementations, the visual re-skinning system used to adjust the interactions between the at least two assets using the 3D representation is part of the synchronization control. In other implementations, the synchronization control engages the visual re-skinning system for interpreting the attributes of the audio signal and adjusting the interactions between the game assets.

In some implementations, the ML algorithm can develop and train an AI model to detect moods from the audio signal provided or shared by the user/other users to determine the relation of the tone or spoken content in the audio signal to a particular emotion and use the particular emotion to adjust the interactions between the assets identified within the game scenes of the game. For instance, when the audio signal is a music with a sad tune or sad lyrics, the posture of the two assets may be adjusted to reflect the mood. For example, the posture of the two assets may be hunched over or the face of the two assets may be bowed down. In some implementations, in addition to synchronizing the interactions between the assets, the synchronization control can be used to adjust the color or look of the game scenes to visually convey the mood or emotion expressed in the audio signal. In some implementations, the audio can be from actions of the user (e.g., clapping, beat-boxing, etc.) and the tone of the audio can be of a particular type. Further, as time goes by the tone of the audio can change—i.e., either increase or decrease. The synchronization control can detect the change in the tone and adjust the interactions between the two assets within the game scenes to match the tone of the audio provided by the user.

Figure 3A:
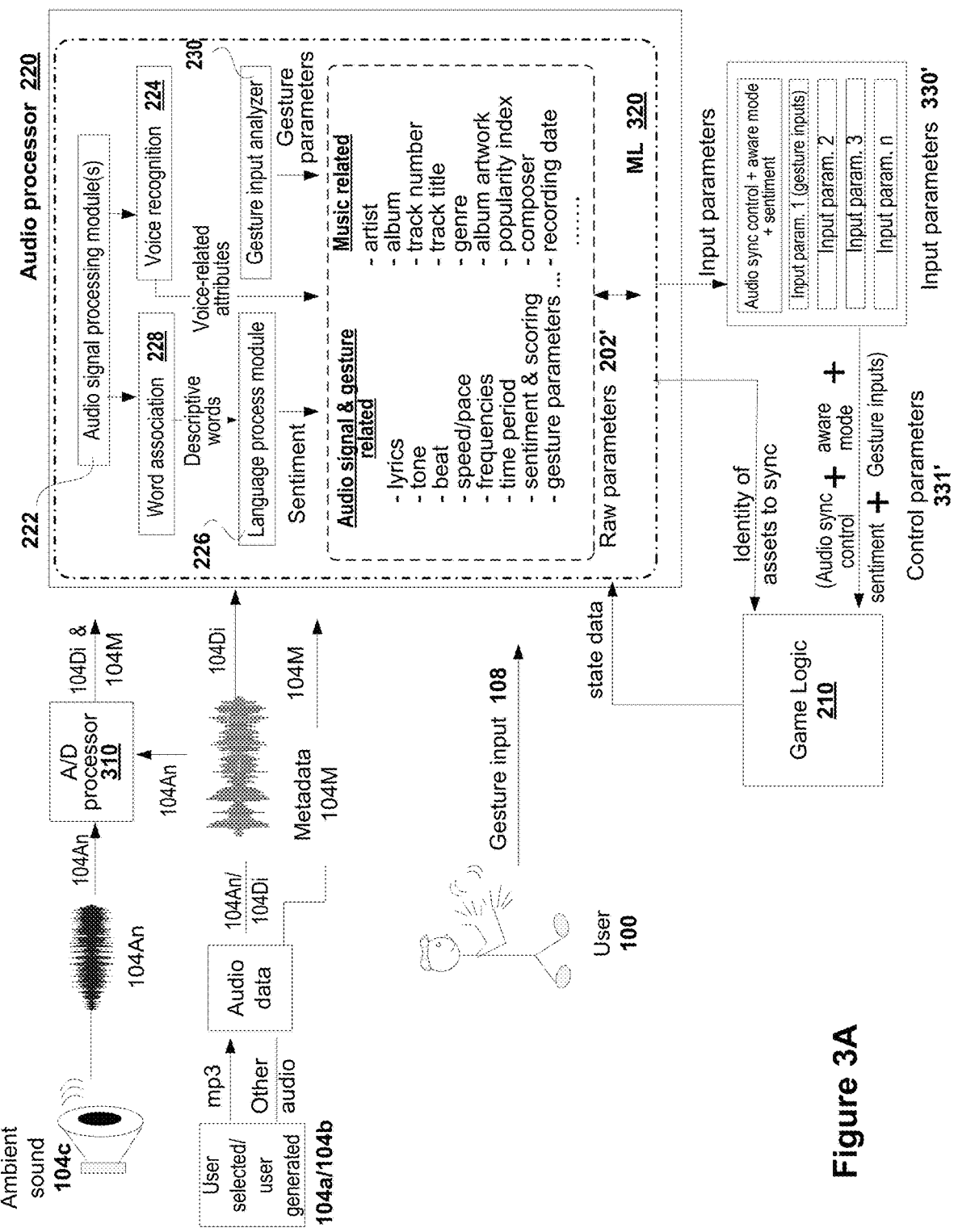
FIG. 3A represents a simplified process flow of different data used to provide audio synchronization control to control at least some interactions of at least two assets rendered in one or more game scenes of a game, in accordance with an alternate implementation.

FIG. 3A illustrates process flow of the audio data 104 and gesture input 108 provided during game play of a game by the user, wherein the processed audio data and gesture inputs are used to synchronize control of interaction between two or more assets within game scenes during game play of the video game, in some implementations. In addition to the audio data 104, which includes data related to audio signal and any metadata associated with the audio signal, the audio processor also uses gesture inputs 108 of the user provided during game play of the game and captured using image capturing devices located in a real-world environment in a vicinity of the user. As noted with reference to FIGS. 2 and 2A, the audio data used for synchronizing interactions between two or more game assets during game play of the video game can be ambient (i.e., background) sound rendering in the physical environment of the user, or can be user generated or user selected or shared. The ambient sound can be from a radio, a tape recorder, a compact disc player, a computing device, etc. The audio signal can be an analog signal 104An, or a digital signal 104Di. In the implementations illustrated in FIG. 3A, the audio related data is processed similar to what was described with reference to FIG. 3. For example, any audio data 104 that includes analog signal 104An is processed by an analog-to-digital processor 310 to generate a corresponding digital signal 104Di. Using the audio signal identifier, any metadata 104$m$ associated with the digital signal 104Di can be obtained by querying a content source or a content provider of the audio signal. The digital signal 104Di and any metadata 104$m$ associated with the digital signal 104Di are provided to the audio processor 220. If the audio data 104 includes digital signal 104Di, then the digital signal 104Di and any metadata 104$m$ associated with the digital signal 104Di are provided directly to the audio processor 220 for processing.

In addition to process modules, such as audio signal processing module(s) 222, voice recognition module 224 and a language process module 226, used to process the audio related data, the audio processor 220, in some implementations, also includes additional processing modules, such as word association module 228 to process the spoken content included in the audio signal and gesture input analyzer 230 to process the gesture inputs 108 provided by the user during game play of the video game. The word association module 228 can work with the language process module 226 to interpret the spoken content in the audio signal in the language spoken to identify the appropriate characteristics of the audio included in the audio signal. The function of the audio signal processing module 222, the voice recognition module 224 and the language process module 226 have already been discussed with reference to FIG. 3, and hence will not be discussed with reference to FIG. 3A.

Any gesture inputs 108 provided by the user are captured by image capturing devices and provided to the audio processor 220. The audio processor 220 engages a gesture input analyzer 230 to process the gesture inputs. The gesture input analyzer 230 is configured to analyze the gesture inputs 108 provided by the user to identify the type of gestures provided by the user and other gesture parameters, such as frequency of the gestures, the extent of the gestures (e.g., a light wave vs. a strong wave, a hand half-raised to wave vs. a hand fully-raised to wave, etc.), the pace/speed, the duration, etc. The identified gesture parameters can be used to validate the sentiment of the user and are included with the audio related parameters to define the raw parameters 202'. The raw parameters 202' include the audio signal related parameters obtained from analyzing the audio signal 104Di, music related parameters obtained from metadata 104*m* and other details provided with the audio signal, and the gesture parameters obtained from analyzing the gesture inputs 108.

In some implementations, the spoken content included in the audio signal (e.g., words included in the lyrics of a music number, words included in speech, etc.) are processed using word association module 228 to determine sentiment expressed in the audio signal. In some implementations, the word association module 228 works with the language process module 226 to perform sentiment analysis and, in some cases, semantic analysis to identify the sentiment expressed in the audio included in the audio signal. The word association module 228 is configured to perform sentiment analysis by identifying and extracting keywords from the spoken content, identifying attributes, such as the tonality, speed, intensity, etc., spoken in the audio signal, identifying keywords association, and interpreting the keywords, keywords association and the attributes of the spoken word to understand the sentiment expressed. The tonality, speed and intensity with which the keywords are uttered in the audio signal provide useful insights of the emotional energy invoked, and are therefore good indicators for identifying the sentiment expressed in the audio. The word association module 228 interprets the spoken content (e.g., lyrics, words, etc.,) in the language in which the audio is rendered so that the sentiment can be correctly identified. In some implementations, the word association module 228 may perform additional analysis in the form of semantic analysis. In the semantic analysis, the word association module 228, in addition to determining the association of the keywords and the relationship between the keywords also identifies and uses the relationship of the association of the keywords as well as the other identified attributes, such as the tonality, speed, intensity, etc., at which the spoken content is presented to better understand the intent conveyed via the spoken content and use the results from the analysis to determine the sentiment (i.e., mood) expressed in the audio signal. In some implementations, the word association module 228 can engage the ML algorithm 320 to perform the semantic analysis.

The ML algorithm 320 develops and trains an artificial intelligence (AI) model using the attributes of the audio signal and use the trained AI model to detect a particular sentiment expressed via the spoken content. The keywords, association of keywords, relationship of the association of keywords to the context of the spoken content, other attributes of the spoken content, such as tonality, intensity, speed, etc., used in the spoken content are used to assign score for each identified attribute, wherein the score is indicative of the level of influence the respective attribute has in determining the emotional energy. The attributes are classified based on the score and used to determine the sentiment. As the spoken content of the audio signal can change over time and in context, the attributes and the scores associated with the different attributes of the spoken content are dynamically updated to reflect the change. The word association module 228 is configured to detect the changes in the score and the attributes of the spoken content and to dynamically adjust the sentiment expressed accordingly. The expressed sentiment is provided with the other audio related parameters as raw parameters 202' to the ML algorithm 320.

In some implementations, the audio processor 220 can engage ML algorithm 320 to perform sentiment analysis and semantic analysis. In these implementations, the ML algorithm 320 includes the various audio data processing modules, such as the audio signal processing module(s) 222, the voice recognition module 224, the language process module 226, the word association module 228 and the gesture input analyzer 230' to process the audio data from the audio signal to identify the audio related parameters, wherein the audio related parameters are the raw parameters 202'. FIG. 3A illustrates one such implementation wherein the various audio data processing modules are integrated within the ML algorithm 320. FIG. 3 illustrates an alternate implementation wherein the audio processing modules, such as the audio signal processing module(s) 222, the voice recognition module 224, and the language process module 226 are separate from the ML algorithm 320. In this implementation, the one or more of the audio processing modules can engage the ML algorithm 320 to perform some of the analysis/processing of the audio signal. It should be understood that the aforementioned list of audio data processing modules is provided as an example and that fewer or additional modules may be engaged to process the audio data.

The ML algorithm 320 processes the raw parameters 202' in the context of the game defined from the state data provided by the game logic 210 to identify specific ones of the raw parameters 202' that can be interpreted by the game logic 210. The specific ones of the raw parameters 202' include the audio synchronization controls, the aware mode, the sentiment expressed in the audio signal and other parameters that provide audio related parameters (e.g., pace, beat, intensity, etc.,) that can be used for controlling synchronization of the at least two assets. The specific ones of the raw parameters are provided as control parameters 330'. The control parameters 330' are usable by the game logic 210 to control synchronization of the assets. The control parameters 330' of FIG. 3A differ from the control parameters 330 of FIG. 3 in that, in addition to the audio synchronization control 330 of FIG. 3, the sentiment expressed in the audio signal and gesture parameters identified from the gesture inputs provided by the user, are included in the control parameters 330' provided to the game logic 210 to fine tune the synchronization of the assets.

The game logic 210 uses the control parameters 330' provided by the ML algorithm 320, and synchronizes interactions between at least two assets identified in the one or more game scenes of the game, based on at least some of the control parameters. The sentiment inputs (i.e., expressed sentiment) and the gesture related inputs are used with the other control parameters to synchronize control of the at least two assets in the game scene of the game. The synchronization of interactions is done in accordance to an aware mode, using the select control parameters 330' in a manner similar to what was discussed with reference to FIG. 3. When the control parameters 330' includes the sentiment expressed as one of the parameters, the expressed sentiment can be used to control synchronization of the assets in the game scenes of the game. Specifically, the expressed sentiment can be used as one of the control parameters 330' to define audio synchronization controls that are employed to adjust the interactions between the assets in the game scenes of the game. For instance, when the assets identified in the game scenes are NPCs (non-playing characters) and the audio signal is a music with a sad tune or sad lyrics, the sad mood can be used to define the audio synchronization controls, which are applied to adjust the posture of the two NPC assets to reflect the sad mood. Adjusting of the posture may be in addition to or in place of adjusting other interactions between the two assets (e.g., hugging or patting). For example, the posture of the two assets can be controlled to show the assets hunched over or the face of the two assets bowed down as an expression of the sad mood. When the assets are shown to be moving, the walking style can be controlled to show the assets dragging their feet or moving at a slower pace with their heads bowed down in tune with the beat or pace of the sad music. In another example, if the audio signal has a happy tune and the NPCs are walking in the game scene, then the NPCs walk may be adjusted to have an extra spring in their steps and their steps can be synchronized to match with the beat or tune of the happy music.

In some implementations, the sentiment expressed in the audio may or may not match the mood within the video game. In such implementations, the sentiment expressed in the audio can be used to control the interactions of the assets and such interactions can be presented for a brief period of time and, after expiration of the period, the interactions of the assets are controlled to resume expressing the sentiment or mood of the video game. The brief period of time, in some implementations, is defined to be between about 1 second and about 5 seconds. The period of time is provided as an example and should not be considered restrictive. The audio processor 220, with the aid of the machine learning algorithm 320 can use the audio inputs including the sentiment expressed and the gesture inputs to generate appropriate audio synchronization controls to influence interactions of two or more assets within the video game, during play of the video game.

The game logic 210 provides the necessary signals (in accordance to the aware mode) to synchronize the interactions of the at least two assets. The game logic also receives user inputs from the user during play of the game. The game logic applies the user inputs, updates the state data and forwards the updated state data to the ML 320, which uses the updated state data to determine the game context, update the audio synchronization control and the aware mode and to identify the assets for synchronizing the interactions, based on the input parameters defined from the audio data. The identity of the assets identified from the updated state data can remain the same or be different based on the updated game state data. The process of receiving the updated game state and adjusting the audio synchronization control and the aware mode continues so long as the audio data is being rendered and so long as the user is playing the game.

To summarize, the various implementations discussed herein provides a user with options to select an input audio with specific beat, tone, pace, etc., and use the audio to synchronize interactions of the two or more assets present within game scenes in accordance to the beat or tone or pace (i.e., characteristics) of the audio. The ML algorithm provides audio synchronization control that is used to instruct the game logic of the game to adjust the interaction of the two assets and such interactions are synchronized to the pace or action or speed of the user-selected audio. The user can select an upbeat or happy audio (e.g., music), and the interactions between the assets is adjusted to cause the assets to interact so as to reflect the happy and/or upbeat mood. In some cases, the audio sound 104 can include a snippet of audio signal that lasts for a short duration (2-5 seconds, for example). In such cases, the adjustment to the two assets is done to last for the duration of the audio snippet and after expiration of the time, the assets return to interacting with one another and/or with other assets in accordance to how the game logic is defined. The implementations allow the user to customize behavior of the game assets in accordance to the music or audio selected by the user and to synchronize the behavior in accordance to at least some characteristics of the selected audio, thereby keeping the user involved and engaged in the game for an extended period.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be a localized to a player playing a game segment (e.g., game console), or remote from the player (e.g., back-end server processor), or one of many servers using virtualization in a game cloud system for remote streaming of gameplay to clients.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory

404, and/or storage 406. The components of device 400, including CPU 402, memory 404, data storage 406, user input devices 408, network interface 414, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 416, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 420 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, game logic of the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement the game logic of the video game, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction. The predicted interaction can be used to control movement of at least two assets in the game, for example. During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made by the user (e.g., player or spectator of a video game) and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method comprising:
receiving audio data while a game is being executed;
identifying one or more keywords spoken in the audio data;
determining, based at least in part on the one or more keywords, a sentiment expressed in the audio data; and
controlling, based at least in part on the sentiment, an interaction between at least two non-player characters being rendered in the game.

2. The computer-implemented method of claim 1, further comprising processing the audio data to identify a language spoken in the audio data, wherein determining the sentiment is based at least in part on the language spoken.

3. The computer-implemented method of claim 2, further comprising converting the audio data to a digital signal that includes metadata, wherein identifying the one or more keywords is based at least in part on the metadata.

4. The computer-implemented method of claim 3, wherein converting the audio data to the digital signal is performed prior to the processing the audio data.

5. The computer-implemented method of claim 3, wherein converting the audio data includes retrieving at least some of the metadata from a content provider website.

6. The computer-implemented method of claim 1, wherein identifying the one or more keywords is determined by interpreting the keywords and relationship between the keywords based on context of spoken text included in the audio data.

7. The computer-implemented method of claim 1, further comprising receiving image data associated with a gestures, wherein determining the sentiment is based at least in part on the image data.

8. The computer-implemented method of claim 1, wherein controlling the interaction is based at least in part on at least one of one or more descriptive characteristics or at least one temporal characteristic associated with the audio data.

9. The computer-implemented method of claim 1, further comprising:
identifying game context of game scenes currently rendering; and
evaluating asset attributes of each asset present in the game scenes to identify the at least two non-player characters, wherein controlling the interaction is based at least in part on the game context.

10. The computer-implemented method of claim 9, wherein controlling the interaction includes synchronizing interactions between the at least two non-player characters.

11. The computer-implemented method of claim 2, wherein
interpreting textual content of the audio data based at least in part on the language spoken, wherein determining the sentiment is based at least in part on an interpretation of the textual content.

12. The computer-implemented method of claim 3, wherein converting the audio data to the digital signal includes using an analog-to-digital processor prior to processing the digital signal based at least in part on the language spoken.

13. The computer-implemented method of claim 1, wherein the audio data is received from a spectator watching a user play the game.

14. One or more non-transitory computer-readable media comprising computer-executable instructions that, when executed by one or more processors of an electronic device, cause the electronic device to perform operations comprising:

receiving audio data while a game is being executed;

identifying one or more keywords spoken in the audio data;

determining, based at least in part on the one or more keywords, a sentiment expressed in the audio data; and controlling, based at least in part on the sentiment, an interaction between at least two non-player characters being rendered in the game.

15. The one or more non-transitory computer-readable media of claim 14, further comprising additional computer-executable instructions that, when executed by the one or more processors, cause the electronic device to perform additional operations comprising receiving image data associated with a gesture, wherein determining the sentiment is based at least in part on the image data.

16. The one or more non-transitory computer-readable media of claim 14, further comprising additional computer-executable instructions that, when executed by the one or more processors, cause the electronic device to perform additional operations comprising processing the audio data to identify a language spoken in the audio data, wherein determining the sentiment is based at least in part on the language spoken.

17. The one or more non-transitory computer-readable media of claim 14, wherein controlling the interaction includes synchronizing interactions between the at least two non-player characters.

18. A system comprising:

a memory comprising computer-executable instructions; and a processor configured to access the memory and execute the computer-executable instructions to perform operations comprising:

receiving audio data while a game is being executed;

identifying one or more keywords spoken in the audio data;

determining, based at least in part on the one or more keywords, a sentiment expressed in the audio data; and controlling, based at least in part on the sentiment, an interaction between at least two non-player characters being rendered in the game.

19. The system of claim 18, wherein the memory comprises additional computer-executable instructions and the processor is further configured to access the memory and execute the additional computer-executable instructions to perform additional operations comprising receiving image data associated with a gesture, wherein determining the sentiment is based at least in part on the image data.

20. The system of claim 18, wherein the memory comprises additional computer-executable instructions and the processor is further configured to access the memory and execute the additional computer-executable instructions to perform additional operations comprising processing the audio data to identify a language spoken in the audio data, wherein determining the sentiment is based at least in part on the language spoken.

* * * * *